United States Patent
Osugi et al.

(10) Patent No.: US 9,196,283 B1
(45) Date of Patent: Nov. 24, 2015

(54) METHOD FOR PROVIDING A MAGNETIC RECORDING TRANSDUCER USING A CHEMICAL BUFFER

(71) Applicant: Western Digital (Fremont), LLC, Fremont, CA (US)

(72) Inventors: Masahiro Osugi, Sunnyvale, CA (US); Lily Yao, Hayward, CA (US); Ming Jiang, San Jose, CA (US); Guanghong Luo, Fremont, CA (US); Wai-Ming J. Kan, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 220 days.

(21) Appl. No.: 13/801,408

(22) Filed: Mar. 13, 2013

(51) Int. Cl.
G11B 5/127 (2006.01)
H04R 31/00 (2006.01)
G11B 5/84 (2006.01)

(52) U.S. Cl.
CPC ......................... *G11B 5/84* (2013.01)

(58) Field of Classification Search
CPC .. C09K 3/1463; C09D 189/00; G11B 23/505; G11B 5/8404; Y10T 428/24149
USPC ......... 29/603.18, 603.13–603.16; 216/88–91, 216/96, 100, 102, 103
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |

(Continued)

*Primary Examiner* — Thiem Phan

(57) ABSTRACT

A method for fabricating a magnetic recording transducer is described. The magnetic recording transducer has an underlayer and at least one layer on the underlayer. The layer(s) are capable of including an aperture that exposes a portion of the underlayer. The method includes providing a neutralized aqueous solution having a chemical buffer therein. The chemical buffer forms a nonionic full film corrosion inhibitor. The method also includes exposing a portion of the magnetic recording transducer including the layer(s) to the neutralized aqueous solution including the chemical buffer. In one aspect this exposure occurs through a chemical mechanical planarization.

6 Claims, 5 Drawing Sheets

(56) References Cited

U.S. PATENT DOCUMENTS

| | | |
|---|---|---|
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,534,407 B2 | 3/2003 | Chang |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,797,624 B2 | 9/2004 | Lee |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,936,543 B2 | 8/2005 | Schroeder et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,524,347 B2 | 4/2009 | Sun et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,678,702 B2 | 3/2010 | Compton et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,732,393 B2 | 6/2010 | Grumbine et al. |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,968,465 B2 | 6/2011 | Small et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,008,202 B2 | 8/2011 | White et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,226,841 B2 * | 7/2012 | Palanisamy Chinnathambi et al. ............ 216/89 |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |

(56) References Cited

U.S. PATENT DOCUMENTS

| | | |
|---|---|---|
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0072439 A1 | 4/2004 | Small et al. |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0064798 A1 | 3/2005 | Hardikar |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0105652 A1 | 5/2008 | Brusic et al. |
| 2008/0148649 A1 | 6/2008 | Liu |
| 2009/0099051 A1 | 4/2009 | Aoyama et al. |
| 2009/0117408 A1 | 5/2009 | Umezawa et al. |
| 2009/0124173 A1 | 5/2009 | Li |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

* cited by examiner

100

Provide Neutralized Aqueous Solution Having Chemical Buffer Therein — 102

Expose Magnetic Recording Transducer to Neutralized Aqueous Solution Containing Chemical Buffer — 104

110

Provide Chemical Buffer to Non-Neutral Aqueous Solution — 112

Neutralize the Non-Neural Aqueous Solution — 114

Alkylphenols     Fatty Alcohols     Amines

_US 9,196,283 B1_

METHOD FOR PROVIDING A MAGNETIC RECORDING TRANSDUCER USING A CHEMICAL BUFFER

BACKGROUND

Conventional magnetic recording heads can be fabricated in a number of ways. FIG. 1 is a flow chart depicting a conventional method 10 for fabricating a magnetic read transducer using a conventional process. For simplicity, some steps are omitted. A conventional magnetoresistive sensor is formed, via step 12. Step 12 typically includes depositing the layers for a magnetic tunneling junction or the like and then defining the layers in the track width direction and the stripe height direction. The stripe height direction is perpendicular to the air-bearing surface (ABS). In some cases, the magnetoresistive sensor is defined in the stripe height direction at a later time. An aluminum oxide refill is provided adjacent to portions of the magnetoresistive sensor, via step 14. At a later time, the aluminum oxide may be removed and a magnetic bias structure formed. A Ru capping layer is provided on the transducer, via step 16. The Ru capping layer covers the magnetoresistive sensor as well as the aluminum oxide refill. A chemical mechanical planarization (CMP) is then typically performed to planarize the top surface of the magnetic transducer being formed, via step 18. A post CMP clean may then be performed, via step 20.

Although the conventional method 10 can be used to form the conventional transducer, there are drawbacks.

Accordingly, what is needed is an improved method for fabricating a magnetic recording transducer, including a magnetoresistive sensor.

SUMMARY

A method for fabricating a magnetic recording transducer is described. The magnetic recording transducer has an underlayer and at least one layer on the underlayer. The layer(s) are capable of including an aperture that exposes a portion of the underlayer. The method includes providing a neutralized aqueous solution having a chemical buffer therein. The chemical buffer forms a nonionic full film corrosion inhibitor. The method also includes exposing a portion of the magnetic recording transducer including the layer(s) to the neutralized aqueous solution including the chemical buffer. In one aspect this exposure occurs through a chemical mechanical planarization.

BRIEF DESCRIPTION OF SEVERAL VIEWS OF THE DRAWINGS

DETAILED DESCRIPTION OF THE PREFERRED EMBODIMENTS 2A-2C are diagrams depicting a conventional read transducer 50 as viewed from the air-bearing surface (ABS) during fabrication. The conventional read transducer 50 is formed using the conventional method 10. Thus, the conventional read transducer 50 includes a shield 52 and a sensor 60 having an AFM layer 62, a pinned layer 64, a tunneling barrier layer 66, and a free layer 68. Aluminum oxide refill 54 and Ru cap 70 are also shown. Note that the Ru cap 70 may be made of Ru layers that are deposited at different times. Thus, FIG. 2A depicts the conventional transducer 50 after step 16 of the method 10 has been performed.

FIG. 2B depicts the conventional transducer 50 during the CMP step 18 of the method 10. Thus, portions of the Ru capping layer 70' and aluminum oxide refill 54' have been removed. An aperture 80 has been formed in the Ru capping layer 70'. The aluminum oxide refill 54 is thus exposed to the CMP slurry. FIG. 2C depicts the conventional transducer 50 after step 18 has been performed. A hole 82 has been formed in the aluminum oxide refill 54". It has been determined that this hole 82 may be due to the nature of the aluminum oxide. More specifically, the aluminum oxide is hydrophilic and may form hydrogen bonds with the water in the solution for the slurry used in the CMP. As a result, a hydration process commences. Through this process, the hydrated aluminum oxide 54' dissolves in the water solution, forming the hole 82. Portions of the sensor 60 may be exposed to water and/or other chemicals. It has been determined that portions of the sensor 60 may corrode. It is believed that this corrosion is due to the exposure of the sensor 60 at the hole 82. Accordingly, a mechanism for reducing corrosion in the TMR sensor is desired.

FIG. 3 is a flow chart depicting an exemplary embodiment of a method 100 for fabricating a structure in a magnetic recording transducer, such as a reader or a writer. For simplicity, some steps may be omitted, performed in another order, and/or combined. The magnetic recording transducer being fabricated may be part of a merged head that includes a read transducer and a write transducer, both of which reside on a slider (not shown) in a disk drive. The method 100 is described in the context of forming a single structure. However, the method 100 may be used to fabricate multiple structures at substantially the same time. The method 100 and system are also described in the context of particular layers. However, in some embodiments, such layers may include multiple sub-layers.

Figure 1:
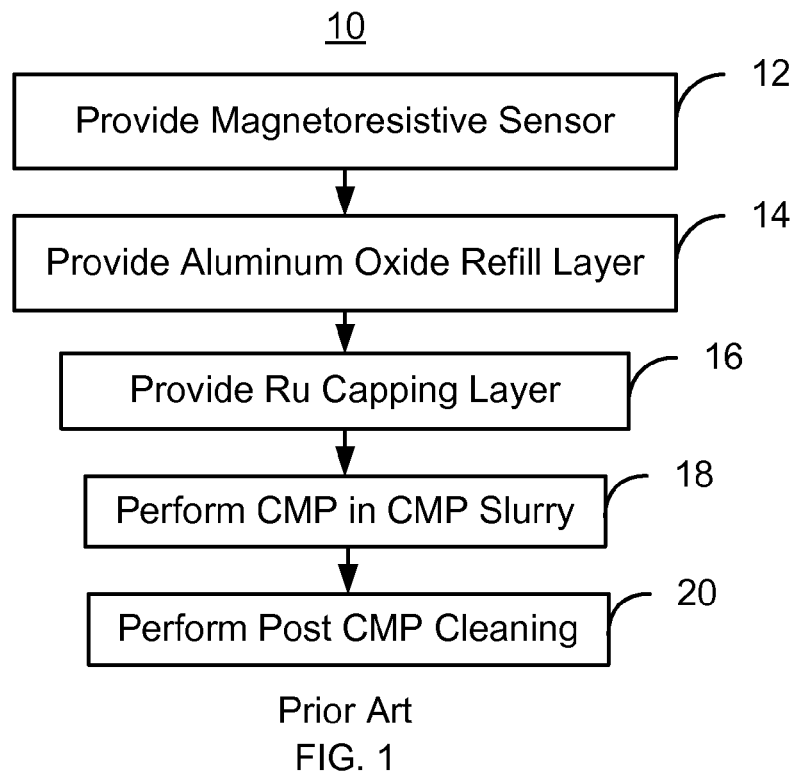
FIG. 1 is a flow chart depicting a conventional method for fabricating a magnetic read transducer.
Figure 2A:
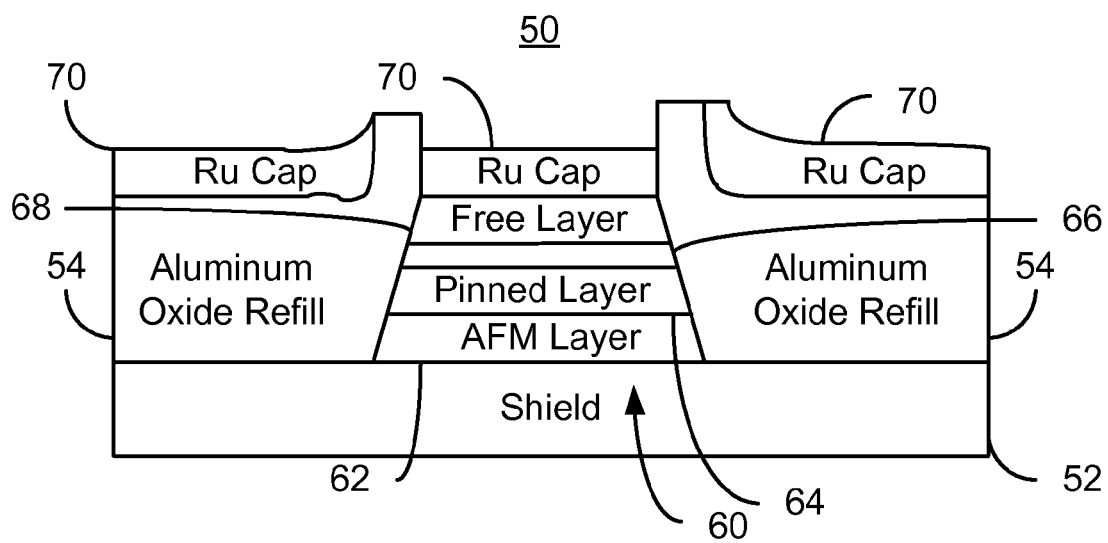
FIGS. 2A-2C are diagrams depicting an ABS view of a conventional magnetic read transducer.
Figure 2B:
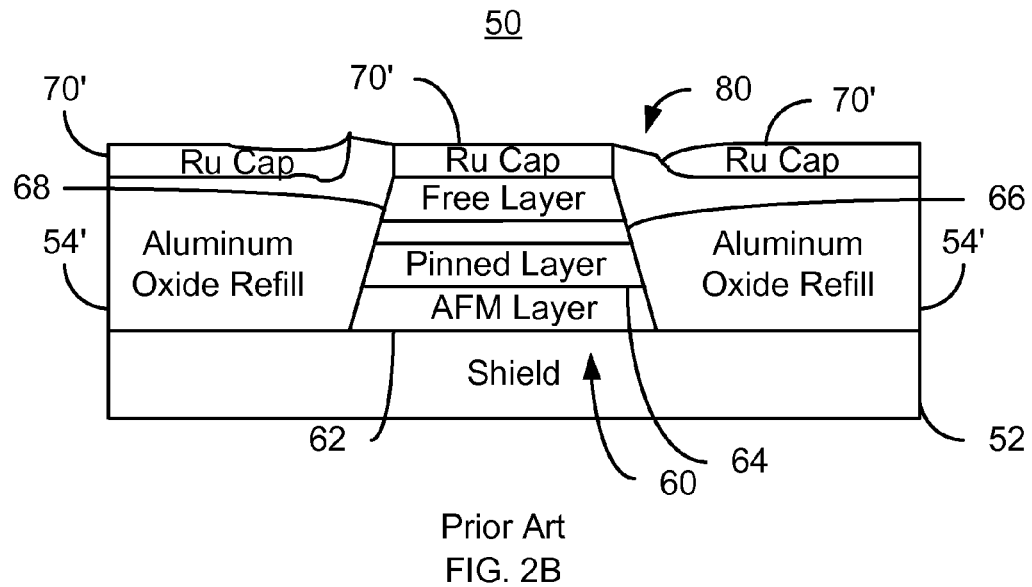
Figure 2C:
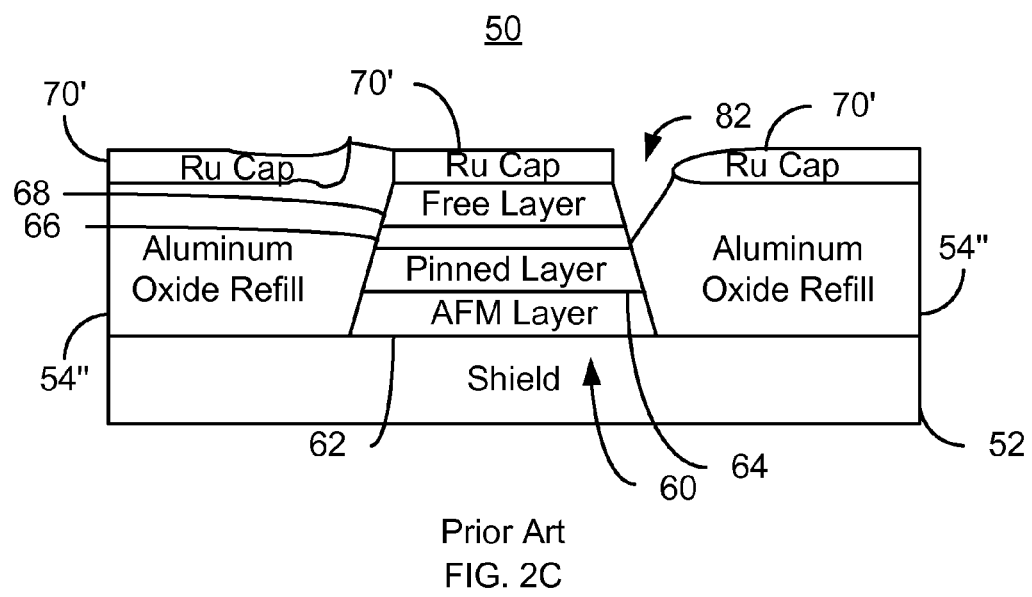
Figure 3:
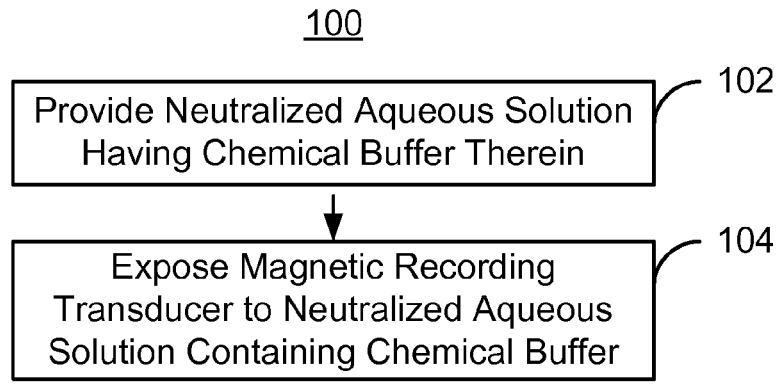
FIG. 3 is a flow chart depicting an exemplary embodiment of a method for fabricating a portion of a magnetic recording transducer.

The method 100 may also commence after formation of other portions of the magnetic recording transducer. For example, the method 100 may start after the underlayer and at least one layer on the underlayer are fabricated. The underlayer may be an aluminum oxide refill, while the layer may be a Ru layer. However, other underlayers and/or layers are possible. Further, the layer and underlayer may each be a multilayer, alloy, or have another structure. The underlayer may also reside on other layers. During fabrication, the layer may have an aperture formed therein. For example, a Ru layer may have an aperture formed therein during planarization such as a CMP. Such an aperture exposes part of the underlayer.

A neutralized aqueous solution having a chemical buffer therein is provided, via step 102. The chemical buffer is for forming a nonionic full film corrosion inhibitor. This nonionic full film corrosion inhibitor forms a full film on the layer(s) of the magnetic transducer exposed to the solution. For example, step 102 may include neutralizing a solution and introducing nonionic surfactant(s). In some embodiments, therefore, step 102 is performed by introducing one or more additives to a solution. The additives may be used to provide the chemical buffer as well as to neutralize a non-neutral solution. In some embodiments, the additive(s) include at least one amine. In other embodiments, the additive(s) include at least one polyoxyethylated nonionic surfactant. The polyoxyethylated surfactants may reduce the surface tension, function as full film corrosion inhibitors and neutralize the solution. Examples of the polyoxyethylated surfactant include but may not be limited to alkylphenols having a hydrophobic tail portion including less than fifteen C—C chains and fatty alcohol ethoxylates also having a hydrophobic tail portion that includes less than the fifteen C—C chains. The tail portions of the alkylphenols and the fatty alcohol ethoxylates may differ, but each is desired to have less than fifteen C—C chains. The concentration of the chemical buffer is desired to be in the semi-micelle range. Thus, not all of the chemical buffer forms micelles in the solution. Instead, at least part of the chemical buffer forms the nonionic full film corrosion inhibitor. Examples of the amine(s) include but may not be limited to quaternary ammonium salt(s). Note that in some embodiments, the amine(s) may bubble in the water. Other water soluble nonionic surfactants with hydroxyl groups or polyoxyethylene chains may also be used to inhibit corrosion. In still other embodiments, some combination of these additives and/or other additives may be used.

A portion of the magnetic recording transducer the layer(s) is exposed to the neutralized aqueous solution including the chemical buffer, via step 104. In some embodiments, the neutralized aqueous solution is a planarization solution. In such embodiments, step 104 may include performing a CMP using a slurry containing the solution formed in step 102.

Because the layer(s) are exposed to the solution in step 104, a nonionic full film corrosion inhibitor may be formed on the magnetic recording transducer. Stated differently a layer of the nonionic full film corrosion inhibitor may be formed on the surface of the portion of the magnetic transducer being fabricated. If step 102 includes using the solution as part of a CMP slurry, the mechanical action of the CMP may still remove portions of the layer as well as the underlayer. However, the nonionic full film corrosion inhibitor may reduce or prevent chemical interactions between the underlayer or layer and the remainder of the solution. As a result, the hydration of the underlayer and resulting removal of portions of the underlayer may be reduced or prevented. Corrosion may also be inhibited. Consequently, damage to other components covered by the underlayer may be diminished or eliminated. For example, corrosion of a magnetoresistive sensor may be addressed. In addition, the layer(s) may be held in the solution in step 104 prior to a post CMP clean. Because of the nonionic full film corrosion inhibitor and the neutral pH of the solution, damage to the layer(s) may also be prevented while they remain in this solution. Thus, yield for fabrication methods employing the method 100 and performance of magnetic recording transducer so formed may be enhanced.

Figure 4:
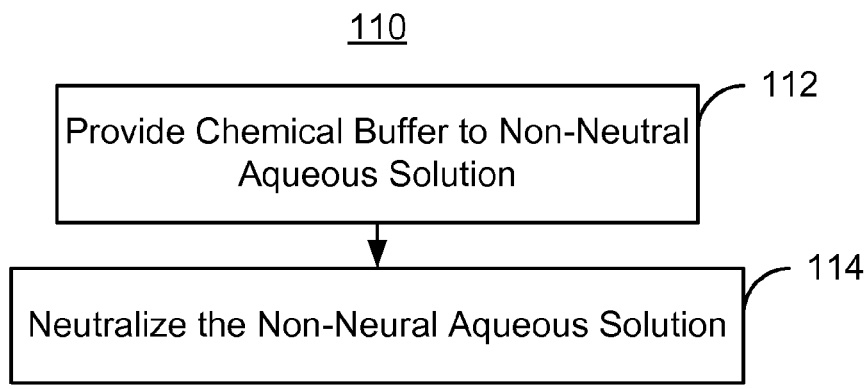
FIG. 4 is a flow chart depicting an exemplary embodiment of a method for providing a neutralized aqueous solution for use in fabricating a magnetic recording transducer.

FIG. 4 is a flow chart depicting an exemplary embodiment of a method 110 for providing a neutralized aqueous solution for use in fabricating a magnetic recording transducer. For simplicity, some steps may be omitted, performed in another order, and/or combined. The magnetic recording transducer being fabricated may be part of a merged head that includes a read transducer and a write transducer, both of which reside on a slider in a disk drive. The method 110 is described in the context of forming a single solution. However, the method 100 may be used to fabricate multiple solutions and/or a single solution used for multiple transducers. The method 110 and system are also described in the context of particular layers. However, in some embodiments, such layers may include multiple sub-layers. The method commences with a non-neutral solution. In some embodiments, the solution may be acidic. For example, some CMP solutions have a pH of approximately 4.8-6.2. In other embodiments, the CMP solutions may have a pH in the range of 5.2-7. In still other embodiments, the non-neutral solution may be basic in nature.

The non-neutral aqueous solution is neutralized, via step 112. Step 112 may include providing additive(s) such as $KH_2PO_4$ and/or NaOH to the non-neutral solution. In other embodiments, the polyoxyethylated nonionic surfactants described above may be used to neutralize the solution. The solution formed is desired to have a pH close to 7.0. In some such embodiments, the pH of the solution is in the 6.5-7.5 range.

Figure 5:
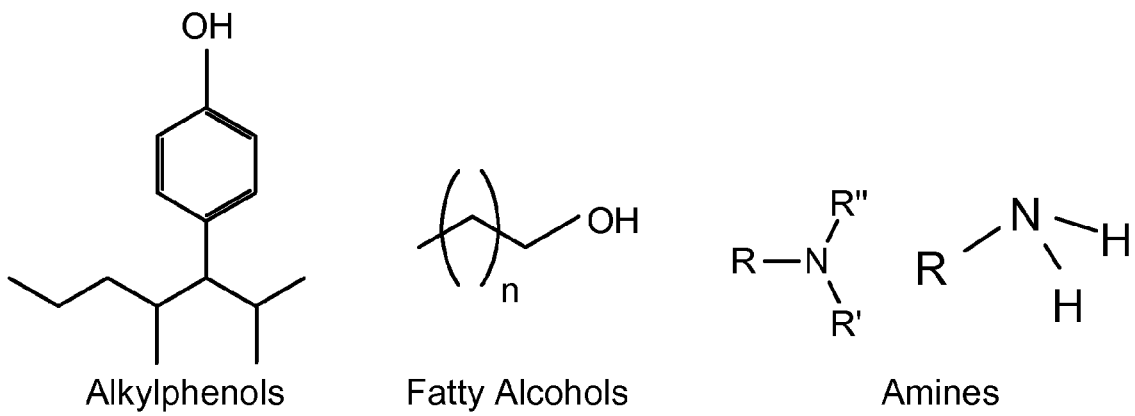
FIG. 5 is diagram depicting exemplary embodiments of group structures for chemical buffer.

At least one additive for the chemical buffer is introduced to the solution, via step 114. The additives may include one or more of the polyoxyethylated nonionic surfactants, amines, and/or other additives described above. FIG. 5 is a diagram depicting exemplary embodiments of the group structures of a portion of the surfactants described above. Referring back to FIG. 4, the concentration of the additives is also generally desired to be in the semi-micelle range (i.e. less than the critical micelle range). In other embodiments, other additives that may be used to form the nonionic full film corrosion inhibitor may be introduced to the solution in step 114. In some embodiments, the solution is neutralized in step 112 before the additives are introduced in step 114. In other embodiments, the additives may be introduced in step 114 first, and then the solution neutralized in step 112. In still other embodiments, steps 112 and 114 may be merged into a single step. For example, the polyoxyethylated nonionic surfactants may both provide the chemical buffer that forms the nonionic full film corrosion inhibitor and neutralize the solution.

Figure 6:
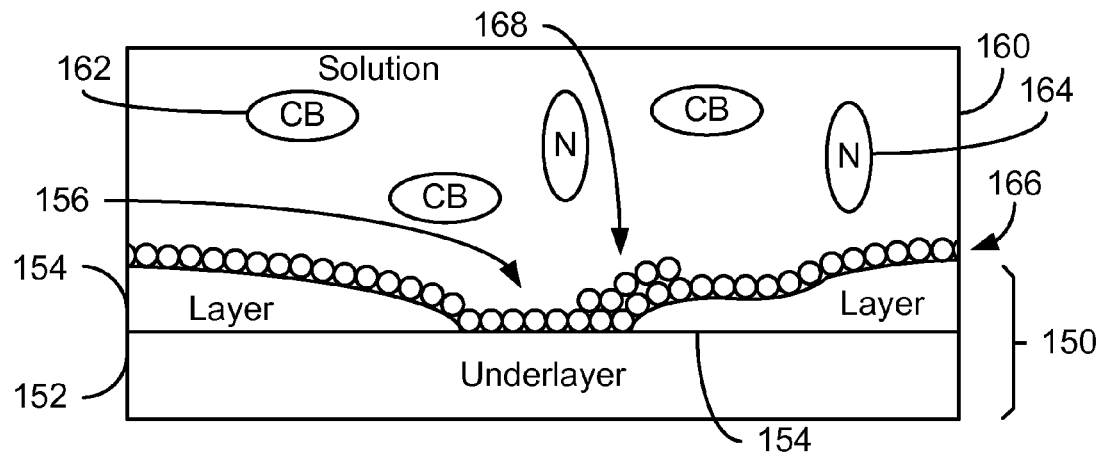
FIG. 6 is a diagram depicting an exemplary embodiment of a magnetic recording transducer during fabrication.

FIG. 6 is a diagram depicting an exemplary embodiment of a magnetic recording transducer 150 during fabrication using the method 100 and/or 110. For clarity, FIG. 6 is not to scale. The magnetic transducer 150 may be a read transducer or a write transducer that may be part of a merged head. The magnetic transducer 150 includes an underlayer 152, which may reside on a bottom shield (not shown). Also included is a layer 154 that resides on the underlayer 152.

FIG. 6 depicts the magnetic transducer 150 during step 104 of the method 100. Thus, a solution 160 has been provided using step 102 and/or the method 110. The aqueous solution 160 is shown as including chemical buffer (CB) 162 (of which only one is labeled) and being neutral (indicated by N 164, of which only one is labeled).

The transducer 150 is being exposed to the solution 160 in the step 104. For example, the solution 160 may be used for a CMP. The transducer 150 may also remain immersed in the solution prior to a post CMP clean. In addition, an aperture 156 has been formed in the upper layer 154. Thus, without more, the underlayer 152 would be exposed to the solution. However, because the solution was prepared using the method 100 and/or 110, a nonionic full film corrosion inhibitor layer 166 has been formed. In the embodiment shown in FIG. 6 most of the layer 166 is a monolayer. However, a portion 168 of the layer 166 includes multiple layers of the chemical buffer. In other embodiments, some or all of the corrosion inhibitor layer 166 may be a monolayer or a multilayer (e.g. a bilayer, trilayer, or other layer).

Using the method 100 and/or 110, performance and fabrication of the magnetic transducer 150 may be enhanced. The magnetic transducer 150 may undergo a CMP, be held in solution prior to a post CMP clean, or undergo other processing that exposes the underlayer 152 to the ambient. However, because the solution 160 is neutral, the underlayer 152 may be less likely to be dissolved in the solution 160. Because of the presence of the chemical buffer 162 and formation of the nonionic full film corrosion inhibitor layer, corrosion of portions of the transducer 150 including but not limited to the layers 152 and 154 may be reduced or eliminated. Thus, fabrication of the magnetic transducer 150 may be improved.

Figure 7:
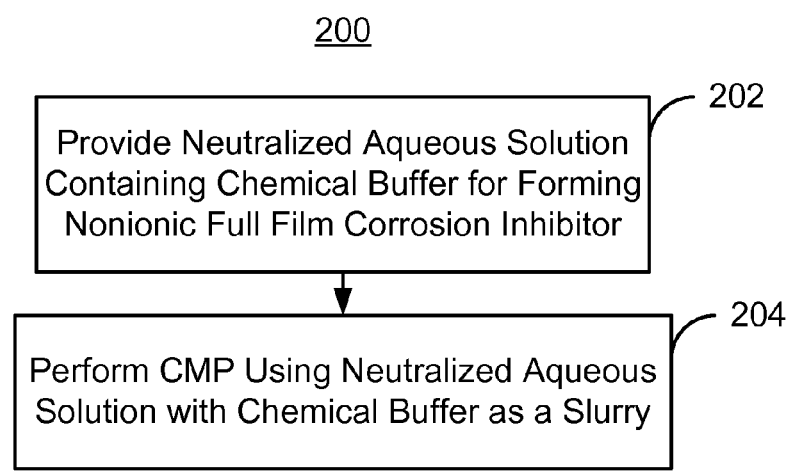
FIG. 7 is a flow chart depicting another exemplary embodiment of a method for fabricating a magnetic recording transducer.
Figure 8A:
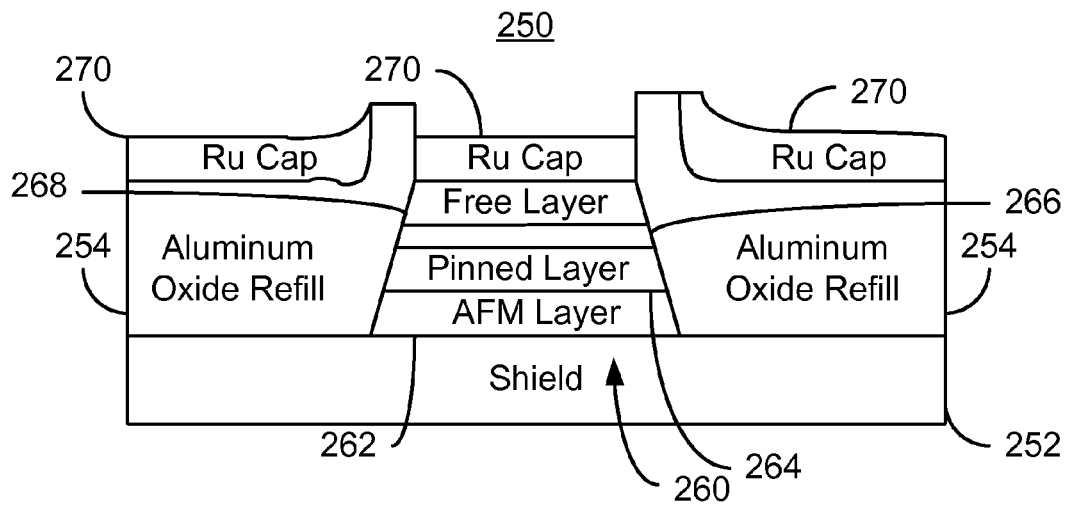
FIGS. 8A-8B are diagrams depicting an exemplary embodiment of a magnetic recording transducer during fabrication.
Figure 8B:
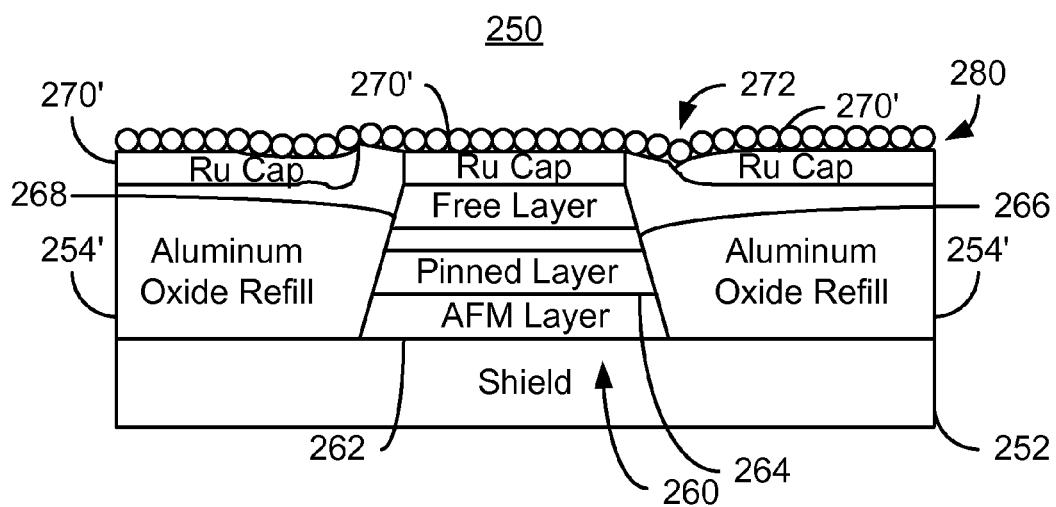

FIG. 7 is a flow chart depicting another exemplary embodiment 200 of a method for fabricating a magnetic recording read transducer. For simplicity, some steps may be omitted, performed in another order, and/or combined. FIGS. 8A-8B are diagrams depicting an exemplary embodiment of a magnetic recording read transducer 250 during fabrication. For clarity, FIGS. 8A-8B are not to scale. Referring to FIGS. 7-8B, the method 200 is described in the context of the transducer 250. However, the method 200 may be used to form another device (not shown). The transducer 250 being fabricated may be part of a merged head that also includes a write head and resides on a slider (not shown) in a disk drive. The method 200 also may commence after formation of other portions of the transducer 250. The read transducer being fabricated may be part of a merged head that includes a write transducer, both of which reside on a slider (not shown) in a disk drive. The method 200 is described in the context of forming a single transducer. However, the method 200 may be used to fabricate multiple transducers at substantially the same time. The method 200 and system are also described in the context of particular layers. However, in some embodiments, such layers may include multiple sub-layers.

A neutralized aqueous solution having a chemical buffer therein is provided, via step 202. The chemical buffer forms a nonionic full film corrosion inhibitor. This nonionic corrosion inhibitor would form a full film on the upper layer. This full film may be a monolayer of the chemical additive. In some embodiments, step 202 is performed by introducing one or more polyoxyethylated nonionic surfactants and/or amines. Such surfactants may both neutralize the solution and allow for formation of the nonionic full film corrosion inhibitor. The polyoxyethylated surfactant may include but may not be limited to alkylphenols having a hydrophobic tail portion including less than fifteen C—C chains and fatty alcohol ethoxylates also having a hydrophobic tail portion that includes less than the fifteen C—C chains. The tail portions of the alkylphenols and the fatty alcohol ethoxylates may differ, but each is desired to have less than fifteen C—C chains. Examples of the amine(s) include but may not be limited to quaternary ammonium salt(s). The concentration of the chemical buffer is desired to be in the semi-micelle range. Thus, not all of the chemical buffer forms micelles in the solution. Instead, at least part of the chemical buffer forms the nonionic full film corrosion inhibitor.

In step 204, a CMP is performed on the magnetic recording transducer 250 using the neutralized aqueous solution provided in step 202. For example, FIG. 8A depicts the transducer 250 before step 204 is performed. The transducer 250 thus includes a shield 252, aluminum oxide refill 254 and a sensor 260. In the embodiment shown, the sensor 260 may be a TMR sensor including an AFM layer 262, a pinned layer 264, a tunneling barrier layer 266 and a free layer 268. However, in other embodiments, the sensor 260 may include different and/or additional layers. Also shown is a Ru capping layer 270 that has also been formed. The magnetic transducer 250 is desired to undergo a CMP. Thus, the solution is formed in step 202 and a CMP of the transducer 250 is performed in step 204.

FIG. 8B depicts the transducer 250 as step 204 is performed. FIG. 8B may also be considered to display the transducer 250 while it is being held in solution before a post CMP clean. For clarity, the solution is not explicitly depicted. Because the transducer 250 is undergoing a CMP, portions of the layers 254 and 270 have been removed. Thus, a Ru capping layer 270' having an aperture 272 therein is shown. Because the solution formed in step 202 is used, a nonionic corrosion inhibitor layer 280 has been formed on the surface of the transducer 250. In the embodiment shown, the layer 280 is a monolayer. In other embodiments, the layer 280 may have another structure including but not limited to additional layers. However, the layer 280 is generally desired to be a full film that entirely covers the portion of the transducer 250 exposed to the solution. Further, the solution has been neutralized in step 202. Thus, the aluminum oxide refill 254' is less likely to form a hole therein. In addition, portions of the sensor 260 are less likely to corrode. Thus, yield for fabrication methods employing the method 200 and performance of magnetic recording transducer 250 so formed may be enhanced.

We claim:

1. A method for fabricating a magnetic recording transducer having an underlayer, at least one layer on the underlayer, and a structure under the underlayer, the at least one layer capable of including an aperture that exposes a portion of the underlayer, the method comprising:
   providing a neutralized aqueous solution having a chemical buffer therein, the chemical buffer for forming a nonionic full film corrosion inhibitor that inhibits removal of the portion of the underlayer exposed by the aperture by forming the nonionic full film corrosion inhibitor on at least the aperture; and
   exposing a portion of the magnetic recording transducer including the at least one layer to the neutralized aqueous solution including the chemical buffer, corrosion of the structure being inhibited by inhibition of removal of the portion of the underlayer by the nonionic full film corrosion inhibitor.

2. The method of claim 1 wherein the step of providing the neutralized aqueous solution including the chemical buffer therein is performed by introducing at least one additive to an aqueous solution.

3. The method of claim 2 wherein the at least one additive includes at least one of at least one amine and at least one polyoxyethylated nonionic surfactant.

4. The method of claim 3 wherein the at least one polyoxyethylated surfactant includes at least one of alkylphenols having a first hydrophobic tail portion including less than fifteen C—C chains and fatty alcohol ethoxylates having a second hydrophobic tail portion including less than the fifteen C—C chains.

5. The method of claim 3 wherein the at least one amine includes at least one quaternary ammonium salt.

6. The method of claim 3 wherein the at least one additive has a concentration in a semi-micelle range.

* * * * *